Oct. 17, 1939.    F. S. SCHWARCZ    2,176,512
DRIVING MEANS FOR A MACHINE HAVING A MOVABLE GAUGE
Filed Dec. 20, 1938    3 Sheets-Sheet 1
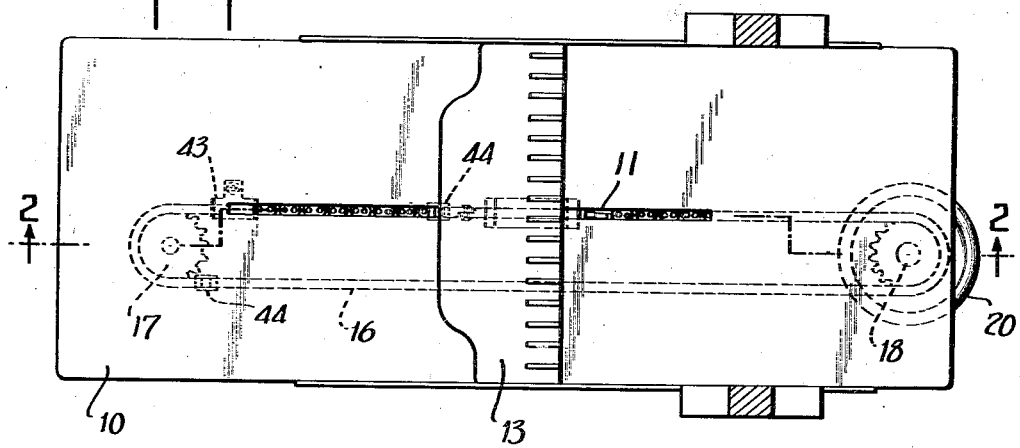
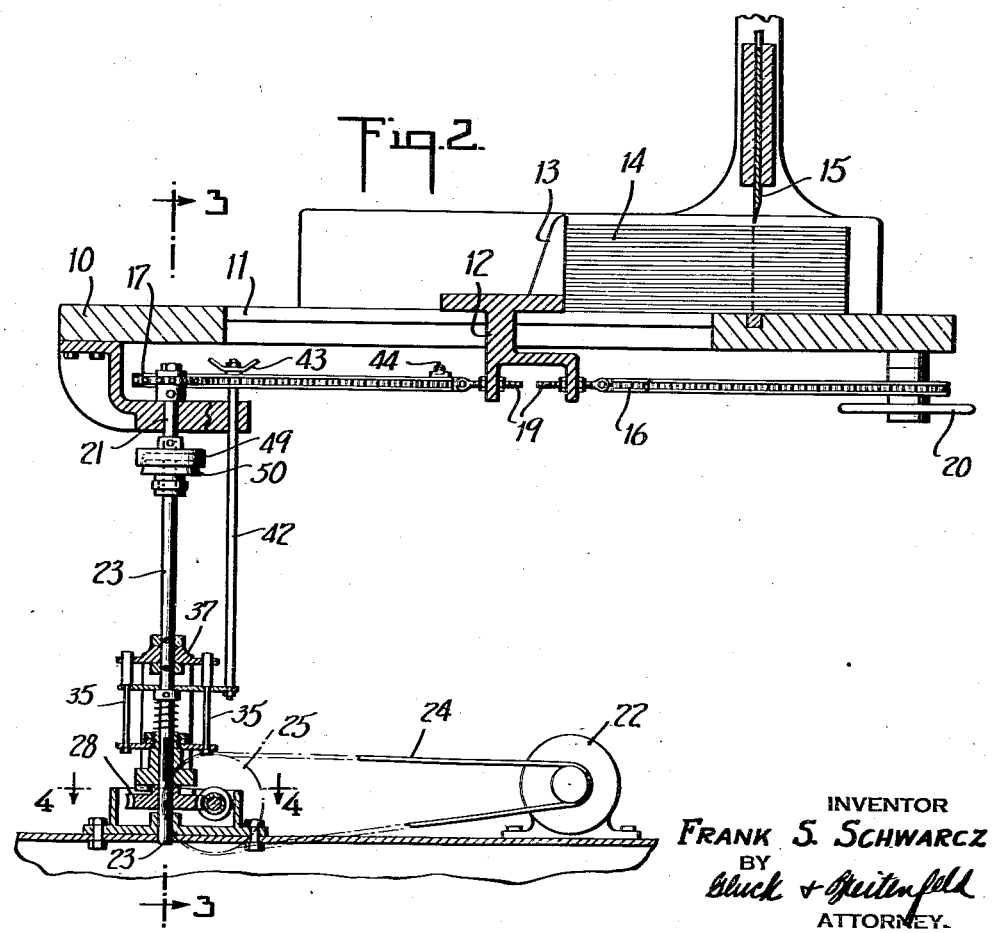
INVENTOR
FRANK S. SCHWARCZ
BY
ATTORNEY.

Oct. 17, 1939.  F. S. SCHWARCZ  2,176,512
DRIVING MEANS FOR A MACHINE HAVING A MOVABLE GAUGE
Filed Dec. 20, 1938   3 Sheets-Sheet 2
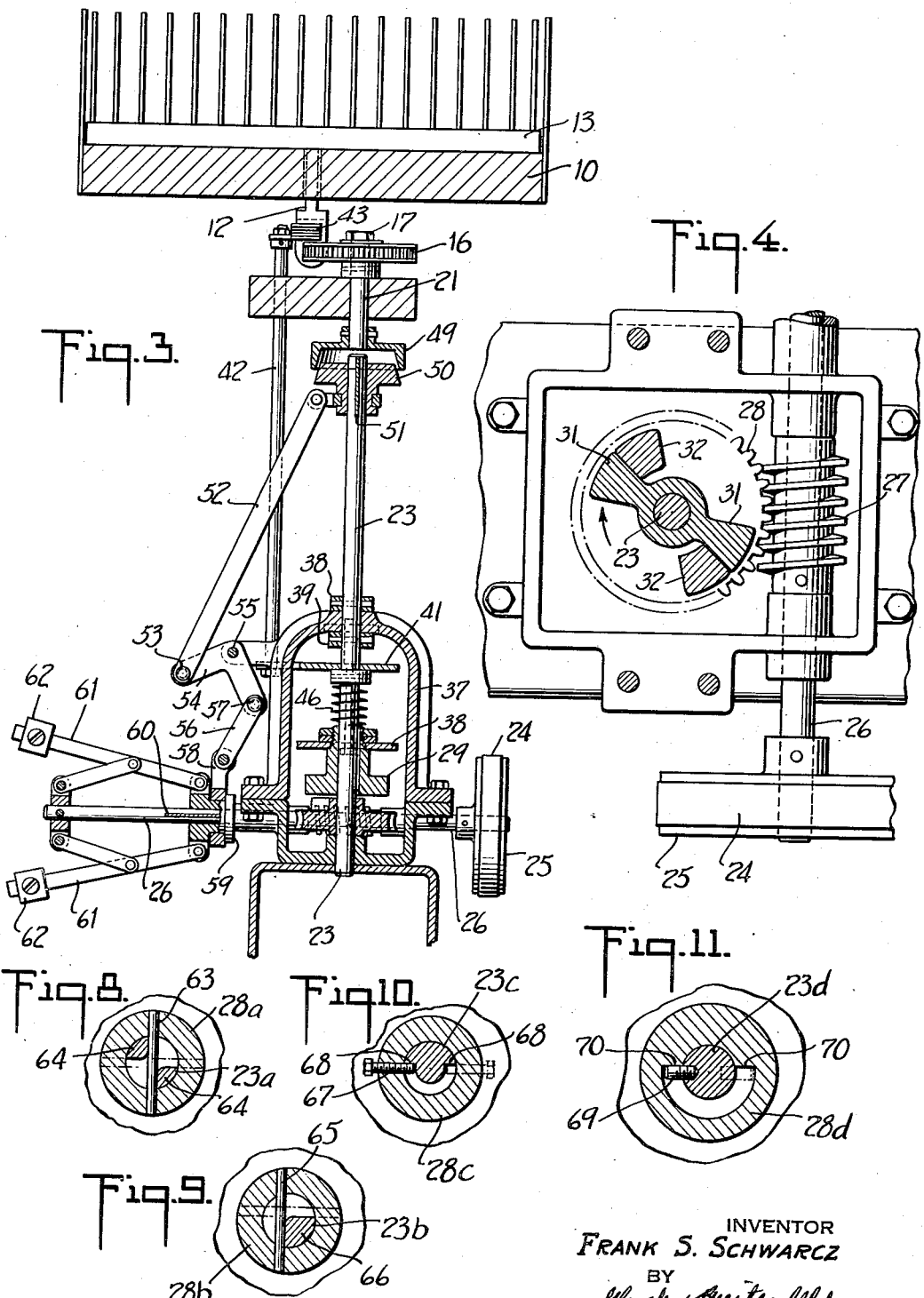
INVENTOR
FRANK S. SCHWARCZ
BY
ATTORNEY Oct. 17, 1939.  F. S. SCHWARCZ  2,176,512
DRIVING MEANS FOR A MACHINE HAVING A MOVABLE GAUGE
Filed Dec. 20, 1938   3 Sheets-Sheet 3
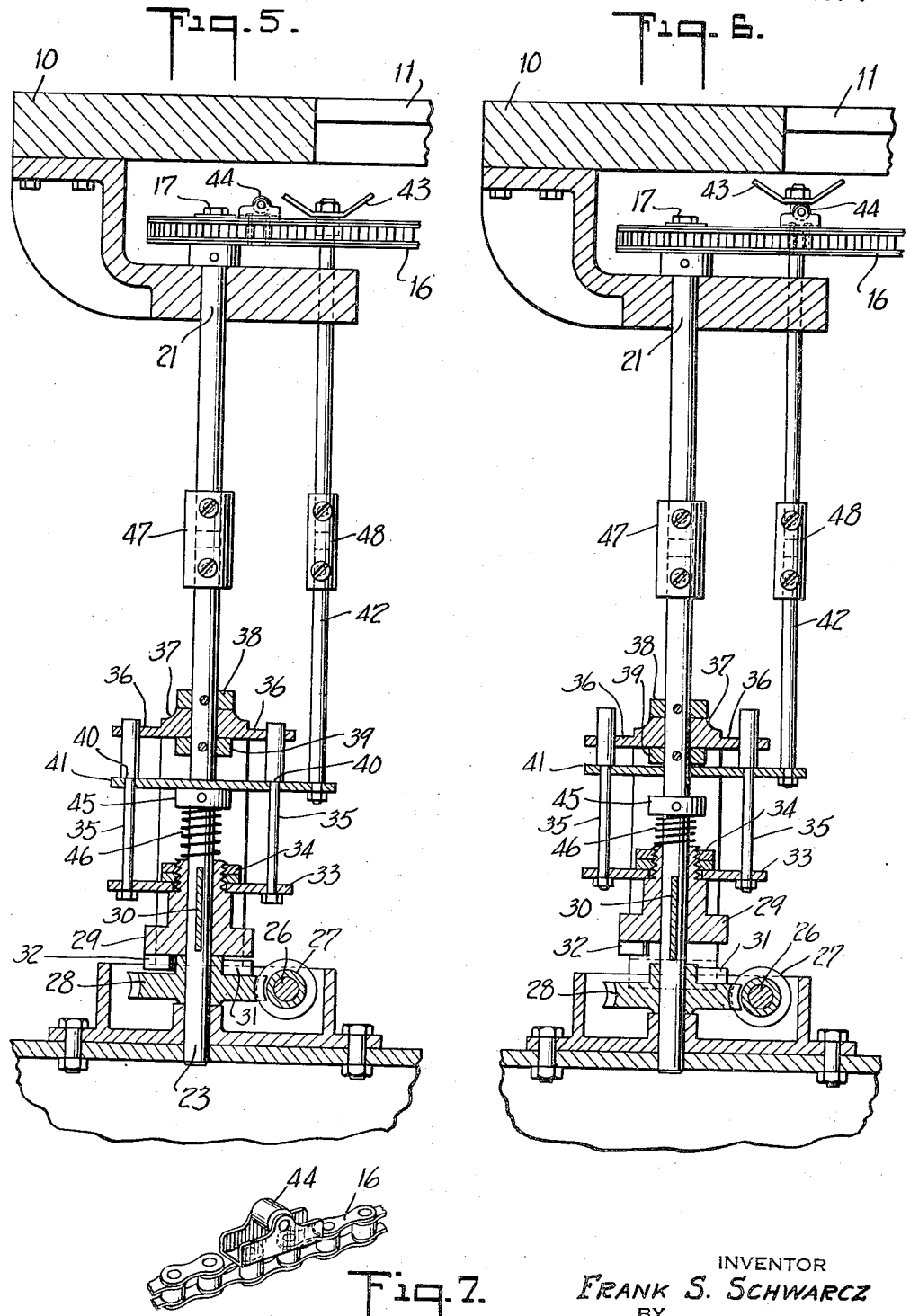
INVENTOR
FRANK S. SCHWARCZ
BY
ATTORNEY Patented Oct. 17, 1939

2,176,512

UNITED STATES PATENT OFFICE 2,176,512

DRIVING MEANS FOR A MACHINE HAVING A MOVABLE GAUGE

Frank S. Schwarcz, New York, N. Y.

Application December 20, 1938, Serial No. 246,839

10 Claims. (Cl. 164—59)

My present invention relates generally to machines having movable gauges or equivalent members, and has particular reference to certain improvements in the driving means.

A shearing machine, of the character used by printers and book binders, is typical of the kind of machine to which my invention has primary reference; and for the purpose of explaining the nature of my invention I have therefore illustrated and shall hereinafter describe certain elements of a shearing machine of this character. It will be understood however that certain phases of my invention are not thus restricted.

Movably mounted on the bed plate of a shearing machine is a gauge which is intended and adapted to be advanced and retracted to various operative positions relative to the shearing instrumentality itself. The purpose of this gauge is to hold a stack of sheets in firm and proper relationship, during the shearing operation. Since this gauge, or equivalent element, is relatively heavy, its adjustments from place to place are frequently effected by means of a source of power, such as an electric motor.

Since, by the nature of its function, the gauge must be brought to rest in accurately selected positions, and since the operation of a motor cannot usually be controlled with the degree of accuracy that would be necessary, a machine of this character should be provided with some arrangement for final adjustment of the gauge, after the motor has ceased to function. A manually-operated hand wheel or the like is adequate for this purpose, but the driving arrangement must be such as to permit the hand wheel to function independently of the motor.

It is a general object of the present invention to provide an improved driving means which is uniquely capable of accomplishing the foregoing general objective.

A more particular object is to provide a driving arrangement which may be conveniently installed, as an adjunct, in association with shearing machines or the like which were not originally designed or intended to have the gauge operated from a power source.

In a preferred embodiment, it is a further object of the invention to provide an efficient and simple mechanical means for automatically limiting the extent of advancement or retraction of the gauge, thereby preventing the damage or injury that might occur if the power driven gauge is inadvertently allowed to continue moving in either one or the other direction.

In another embodiment, it is a further object to provide a means for automatically rendering the motor ineffective except when the speed of the motor is above a predetermined minimum. In this way, the inertia of the motor, after its power supply has been cut, is prevented from continuing the movement of the gauge, as a result of which the act of power-disconnection is more accurately correlated to the desired stoppage of gauge-movement.

In general, it is an object of the invention to provide an installation which is fundamentally simple in structural nature, inexpensive to manufacture and install, rugged and reliable, and of workmanlike character.

I achieve the foregoing objects, and such other objects as may hereinafter appear or be pointed out, in the manner illustratively exemplified in the accompanying drawings, in which—

Figure 1 is a plan view of a shearing machine, showing those parts which are essential to the understanding of the present invention;

Figure 2 is a cross-sectional view taken substantially along the line 2—2 of Figure 1;

Figure 3 is a cross-sectional view taken substantially along the line 3—3 of Figure 2, and on an enlarged scale;

Figure 4 is a greatly enlarged cross-sectional view taken substantially along the line 4—4 of Figure 2;

Figure 5 is a view similar to Figure 2, on a further enlarged scale, illustrating a modification;

Figure 6 is a view similar to Figure 5 showing the parts in an adjusted relationship;

Figure 7 is a fragmentary perspective view of one of the rollers associated with the chain; and Figures 8, 9, 10 and 11 are fragmentary cross-sectional views similar to Figure 4 illustrating different modifications.

In the machine which I have chosen for illustration a bed plate 10 is provided with a longitudinal slot 11 through which a shank 12 extends. Mounted on the shank, above the plate 10, is the gauge 13. This gauge is intended to bear against the rear edge of a stack of sheets 14 (shown in Figure 2) which rest upon the plate 10 and which are intended to be cut by a shearing instrumentality 15.

In order that the shearing cut shall take place accurately along the desired plane, the gauge 13 is adjustable backwards and forwards in the slot 11, and its movement must always be capable of accurate termination at a particularly chosen spot.

The movements of the gauge 13 are controlled by a chain 16 which extends around a sprocket 17 at the rear of the machine, and around a corresponding sprocket 18 at the front of the machine, these sprockets being so positioned that one side of the chain loop lies substantially beneath the slot 11. The shank 12 is connected to this section of the chain by any suitable means which is designated generally in the drawings by the reference numeral 19.

For a purpose hereinafter to be described, a manually-operable hand wheel 20 is associated with the sprocket 18.

It will be understood that the bed plate, and its associated parts, are suitably supported in an elevated position relative to the floor, and I have deemed it unnecessary for the present purpose to illustrate any of the details of the supporting structure, nor have I illustrated any of the various other details of the shearing machine, which have no direct bearing upon the present invention, and which are well known per se.

The present installation is one which is capable of attachment to the sprocket 17, preferably to the vertical shaft 21 upon which this sprocket is mounted.

The elements of this driving mechanism, common to both embodiments herein illustrated consist of the power source 22, the driven shaft 23, which is preferably aligned with the shaft 21, and a driving arrangement between the source 22 and the shaft 23.

The motive power 22 is preferably an electric motor, and preferably a reversible motor. I have illustratively shown a belt 24, by means of which rotation is imparted to a member such as a pulley 25 and to a shaft 26 on which this pulley is mounted. Secured on this shaft is a worm 27 which is constantly and inseparably meshed with a worm wheel 28. The latter is mounted for free rotation on a vertical shaft 23.

This worm wheel may conveniently serve as the driving element of two clutch elements, the driven clutch element being designated by the reference numeral 29 and splined as at 30 to the shaft 23.

In accordance with my invention, these clutch elements have cooperating projections which are so arranged as to provide a substantial clearance in advance of the driven projection. Upon reference to Figure 4, it will be observed that I have shown two diametrically opposed projections 31 on the upper face of the worm wheel 28, and I have shown a pair of corresponding projections 32 on the undersurface of the driven clutch element 29.

Assuming that the worm wheel 28 is rotating in the direction of the arrow of Figure 4, it will be observed that the projections are so arranged that there is a substantial clearance in advance of each driven projection 32. As a result, the driven clutch element 29 is free for further rotation in the same direction, independently of the motor, after the latter has ceased driving. This further advancement, it is contemplated, will be effected by means of the hand wheel 20 previously referred to, and by means of this further advancement it is possible to make a final adjustment of the position of the gauge 13, independently of the motor, in order to bring the gauge 13 accurately into the position desired.

Where there are two driving projections, and corresponding driven projections, as shown in Figure 4, the clearance in advance of each driven projection is slightly less than 180° and the free advancement of the driven gear element is therefore correspondingly limited to something less than a half revolution. This is usually sufficient, however, to effect the desired final adjustment of the gauge.

It will be understood, however, that a single driving projection, and a single driven projection, would be sufficient; and in such an event, the clearance in advance of the driven projection would be almost 360°.

It is obvious that the projections are capable of cooperation, in the same way, during reverse movement of the motor, i. e., with the worm wheel 28 driving in a counterclockwise direction as viewed in Figure 4; and that in such an event there is again a substantial clearance in advance of each driven projection, allowing a final adjustment, independently of the motor.

In accordance with a further object of my invention, I provide a yoke 33 in association with the driven clutch element 29. I have shown this yoke in a form of a disk or collar which engages slidably within an annular groove. This groove may be formed by a shoulder, and by nuts or equivalent elements 34. Projecting upwardly from diametrically opposite portions of the yoke 33 are rods 35 whose upper ends are guided within diametrically opposed ears 36 formed on a casting or frame 37 which serves at the same time as an elevated bearing for the shaft 23. Collars 38 and 39, secured to the shaft 23, retain this shaft against axial movement relative to the frame 37.

Each of the rods 35 is provided with a downward shoulder 40, and engaging beneath these shoulders is a lifting plate 41 secured to the bottom end of a lifting rod 42. The latter carries the cam element 43 at its upper end, and this cam element is preferably constructed with two upwardly divergent wings arranged in operative adjacence to the chain 16. The wings are preferably arranged directly over the chain, as shown most clearly in Figures 1 and 3 so that rollers 44 carried by and movable with the chain are adapted to encounter one or the other of the cam wings and thereby effect an elevation of the lifting rod 42. This is illustrated most clearly in Figures 5 and 6, and it will be observed that the elevation of the lifting rod 42 carries with it the lifting plate 41 and the rods 35, resulting in the elevation of the driven clutch element 29 into the position of Figure 6. In this position, the clutch element 29 is out of engagement with the driving clutch element, as a result of which the continued rotation of the worm wheel 28 is ineffective to continue a rotation of the shaft 23.

There are two rollers or abutments 44 mounted on the chain 16, and their relative positions are shown with approximate accuracy in Figure 1. They are so positioned that they will operate upon the cam element 43 whenever the gauge 13 has reached either a predetermined limit of advancement or a predetermined limit of retraction. In this way, the machine is automatically guarded against inadvertent advancement or retraction of the relatively heavy gauge 13 beyond predetermined limits. It will be understood that the elements 44 are intended to be relied upon only to stop the movement of the gauge 13 automatically when, through inadvertence, it reaches these predetermined limits, and that, in the regular operation of the machine, it is contemplated that the motor 22 will be stopped, by means of a switch or the like, before these limits are reached.

It is preferable to arrange a collar 45 on the shaft 23 immediately beneath the lifting plate 41, and to arrange a compression spring 46 between this collar and the driven clutch element 29. This spring constantly urges the clutch element downwardly into engagement with the driving clutch element, so that under normal circumstances the clutch elements are in engagement. When the upper clutch element is lifted, as in Figure 6, the spring 46 becomes compressed.

It is also preferable to couple the shaft 23 with the shaft 21 by means of a sleeve 47 or other adjustable coupling; and to provide a similar adjustable coupling 48 in the lifting rod 42, so that the parts beneath the couplings 47 and 48 may adjust themselves to the particular elevation of the bed plate of the machine. On the other hand, if the machine is properly designed at the outset, it is obvious that the shaft 23 and the shaft 21 may be integrally connected, and the lifting rod 42 may be an integral element.

Such an arrangement, i. e., without the couplings 47 and 48, is illustrated in the embodiment of Figures 2 and 3 in which a second clutch has been interposed between the motor and the chain. This clutch may be of any suitable character, and I have illustratively illustrated two cooperable clutch disks 49 and 50, the lower one of which is splined as at 51 to the shaft 23.

The movements of the shiftable clutch disk 50 are controlled by a link 52 pivoted as at 53 to one end of a bellcrank 54 which is pivoted to the fixed point 55. A link 56 pivotally connects the outer end 57 of the bellcrank to a yoke 58. The latter is under the control of a collar 59 splined as at 60 to an extension of the shaft 26. Pivoted to the collar 59 are the divergent arms 61 of a fly ball governor, and adjustable weights 62 are mounted on the ends of the arms 61.

By means of this arrangement, the clutch disks 49 and 50 are forced and retained in engagement only when the collar 59 is advanced a predetermined distance to the left, as viewed in Figure 3, and this takes place only when the shaft 26 is rotating at a speed above a predetermined minimum. Conversely, as soon as the speed of the shaft 26 falls below the predetermined minimum, the clutch disks 49 and 50 become disengaged.

The advantage of this arrangement is that the operator may disconnect the electric power from the motor 22 without having to cope with any residual inertia of the motor or the parts driven by it. As soon as the power has been cut off, the motor starts to retard, and if the parts are properly adjusted, then at the commencement of retardation the clutch disks 49 and 50 disengage, thereby discontinuing the advancement of the chain 16, regardless of any continued inertial movement of the motor.

Where the clutch disks 49 and 50 are used, a manual actuation of the chain is always possible, after these clutch disks have disengaged. Accordingly, in an arrangement of this character, the clutch elements 28 and 29 primarily serve only to render the limit-safeguarding means operative, i. e., the arrangement illustratively exemplified by the rollers 44 and the cam 43. It follows, therefore, that if it is desired to dispense with the rollers 44 and with the function which they perform, or if this function is performed by some independent limiting means, then the clutch disks 28 and 29 may also be dispensed with, wherever a clutch arrangement, such as that exemplified by the clutch disks 49 and 50, is provided for.

The structural nature of the clutch elements 28 and 29 is susceptible to wide variations, and in Figures 8–11 I have illustrated various possible modifications.

In Figure 8, the driving clutch element 28a assumes the form of a sleeve surrounding the shaft 23a. This shaft is provided with a diametric slot with flaring ends, thereby providing shaft portions 64 which serve as driven projections corresponding to the projections 32 of Figure 4. The driving projections, corresponding to the projections 31 of Figure 4, are constituted of spaced portions of a pin 63 which is diametrically mounted in the sleeve 28a and which extends through the slot in the shaft.

In Figure 9 a similar arrangement is shown except that the pin 65, carried by the sleeve 28b, is slightly eccentric, and cooperates with a shaft portion 66. The latter is provided in the shaft 23b by cutting an angular slot in this shaft.

In Figure 10, the shaft 23c is provided with an annular slot extending for approximately 180°, thereby providing shoulders 68 which serve as driven projections. The driving projection is in this case a pin 67 which is in screw threaded engagement with the sleeve 28c, and which projects into the annular slot in the shaft.

In Figure 11 it is the shaft 23d which carries the pin 69, and the latter travels in an annular slot provided on the interior of the sleeve 28d. This slot is also of approximately 180° extent, thereby providing shoulders 70. These shoulders serve as driving projections, while the pin 69 is the driven projection.

In the constructions of Figures 8–11 the sleeves 28a, 28b, 28c and 28d are always the driving elements, corresponding to the driving clutch element 28 of Figure 4; and the shafts 23a, 23b, 23c and 23d correspond to the driven shaft 23 of Figure 4. In each case, the driven projection is capable of free further advancement after the driving element has ceased functioning; and in each case the device works equally well in both directions of rotation, as indicated by the dot and dash lines in these figures.

Where a complete disengagement of the clutch elements is desired, corresponding to the elevation of the element 29 in Figures 1–6, the driven shaft may be caused to terminate a slight distance below the plane of the cross-sectional views of Figures 8–11, whereby axial elevation of the shaft serves to raise it out of operative engagement with the driving clutch element.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is—

1. In a machine having a gauge adapted to be advanced and retracted to various operative positions, a gauge-driving means comprising a motor, a worm driven by the motor, a driving clutch element actuated by said worm, a driven clutch element, and a chain driven by said last-named clutch element and controlling the movements of said gauge, said clutch elements having cooperating projections arranged to provide a substantial clearance in advance of the driven projection, whereby the driven clutch element is free for further advancement, independently of the motor, after the latter has ceased driving.

2. In a machine of the character described, the combination with the elements set forth in claim 1, of means automatically operable when the gauge reaches predetermined limits of advancement or retraction for disengaging said clutch elements.

3. In a machine of the character described, the combination with the elements set forth in claim 1, of means automatically operable when the gauge reaches predetermined limits of advancement or retraction for disengaging said clutch elements, said means comprising a normally inoperative clutch disengaging device, and means carried by and movable with the chain for rendering said device operative.

4. In a machine of the character described, the combination with the elements set forth in claim 1, of means automatically operable when the gauge reaches predetermined limits of advancement or retraction for disengaging said clutch elements, said means comprising a normally inoperative clutch disengaging device, a cam element controlling the operation of said device and positioned in operative adjacence to the chain, and means carried by and movable with the chain for engaging said cam element.

5. In a machine of the character described, the combination with the elements set forth in claim 1, of means automatically operable when the gauge reaches predetermined limits of advancement or retraction for disengaging said clutch elements, said means comprising a spline mounting for the driven clutch element, a spring constantly urging said clutch element into engagement with the driving clutch element, a yoke engaging said driven clutch element, a cam element controlling said yoke and positioned in operative adjacence to the chain, and means carried by and movable with the chain for engaging said cam element.

6. In a machine of the character described, the combination with the elements set forth in claim 1, of a second clutch operatively interposed between the motor and the chain, and means for retaining said clutch in engagement only when the speed of the motor is above a predetermined minimum.

7. In a machine of the character described, the combination with the elements set forth in claim 1, of a second clutch operatively interposed between the motor and the chain, and means for retaining said clutch in engagement only when the speed of the motor is above a predetermined minimum, said means comprising a clutch-engaging device, and a centrifugal governor driven by the motor and controlling the operation of said device.

8. In a machine of the character described, the combination with the elements set forth in claim 1, of a second clutch operatively interposed between the motor and the chain, and means for retaining said clutch in engagement only when the speed of the motor is above a predetermined minimum, said means comprising a normally inoperative clutch-engaging device, a fly-ball governor driven by the motor, and a linkage between said governor and said clutch-engaging device.

9. In a machine of the character described, the combination of elements set forth in claim 1, the driven clutch element comprising a slotted shaft, and the driving clutch element comprising a sleeve encircling the shaft, the driving projection comprising a pin carried by the sleeve and extending into said slot.

10. In a machine of the character described, the combination of elements set forth in claim 1, said driven clutch element comprising a shaft, and said driving clutch element comprising a slotted sleeve encircling said shaft, the driven projection comprising a pin carried by the shaft and projecting into said slot.

FRANK S. SCHWARCZ.